US008020690B2

(12) United States Patent
Asma

(10) Patent No.: US 8,020,690 B2
(45) Date of Patent: Sep. 20, 2011

(54) SINGLING MACHINE FOR LOLLIPOPS

(75) Inventor: Seferinus Jelle Asma, Veldhoven (NL)

(73) Assignee: CFS Weert B.V. (NL)

( * ) Notice: Subject to any disclaimer, the term of this patent is extended or adjusted under 35 U.S.C. 154(b) by 280 days.

(21) Appl. No.: 12/297,362

(22) PCT Filed: Apr. 20, 2007

(86) PCT No.: PCT/EP2007/003455
§ 371 (c)(1),
(2), (4) Date: Feb. 2, 2009

(87) PCT Pub. No.: WO2007/121930
PCT Pub. Date: Nov. 1, 2007

(65) Prior Publication Data
US 2009/0294251 A1    Dec. 3, 2009

(30) Foreign Application Priority Data
Apr. 20, 2006  (EP) .................................. 06008187
May 17, 2006  (EP) .................................. 06010176

(51) Int. Cl.
*B65B 11/28*  (2006.01)
(52) U.S. Cl. ................................ 198/470.1; 198/867.11
(58) Field of Classification Search .................. 198/450, 198/459.2, 470.1, 474.1, 476.1, 478.1, 803.2, 198/867.11
See application file for complete search history.

(56) References Cited

U.S. PATENT DOCUMENTS

| 1,809,358 A | 6/1931 | Savage |
| 2,246,243 A | 6/1941 | Ross |
| 2,705,857 A | 4/1955 | Fox et al. |
| 3,038,635 A | 6/1962 | Rasmussen |
| 3,741,698 A | 6/1973 | Caroli |
| 3,851,440 A | 12/1974 | Horsky |
| 3,987,605 A | 10/1976 | Johnson |
| 4,008,812 A | 2/1977 | Stuart |
| 4,130,936 A | 12/1978 | Cottrell |
| 4,535,605 A | 8/1985 | Gram |
| 4,539,790 A | 9/1985 | Zamboni |
| 4,714,419 A | 12/1987 | Nielsen |
| 4,729,501 A | 3/1988 | Lowrance |

(Continued)

FOREIGN PATENT DOCUMENTS

DE    4213830 A1    11/1993

(Continued)

OTHER PUBLICATIONS

Copending application., U.S. Appl. No. 12/297,362, filed Oct. 16, 2008, (WO2007/121930).

(Continued)

*Primary Examiner* — Douglas Hess
(74) *Attorney, Agent, or Firm* — Dobrusin & Thennisch PC

(57) ABSTRACT

The present invention is related to a singling equipment for a device for packaging articles, comprising a singling plate which rotates around an axis and a removing wheel which rotates around an axis and which comprises a plurality of removing units with two grippers for receiving and clamping the articles, whereas both grippers are pivotable around a respective gripper lever axis, each removing unit is ratable around an own pivot axis and each gripper has a gripper jab, whereas the distance between the gripper lever axis and the gripping jaw is equal at each gripper-pair and the gripper jaws are designed to grip the stick of a lollipop.

20 Claims, 1 Drawing Sheet

U.S. PATENT DOCUMENTS

Figure 1:
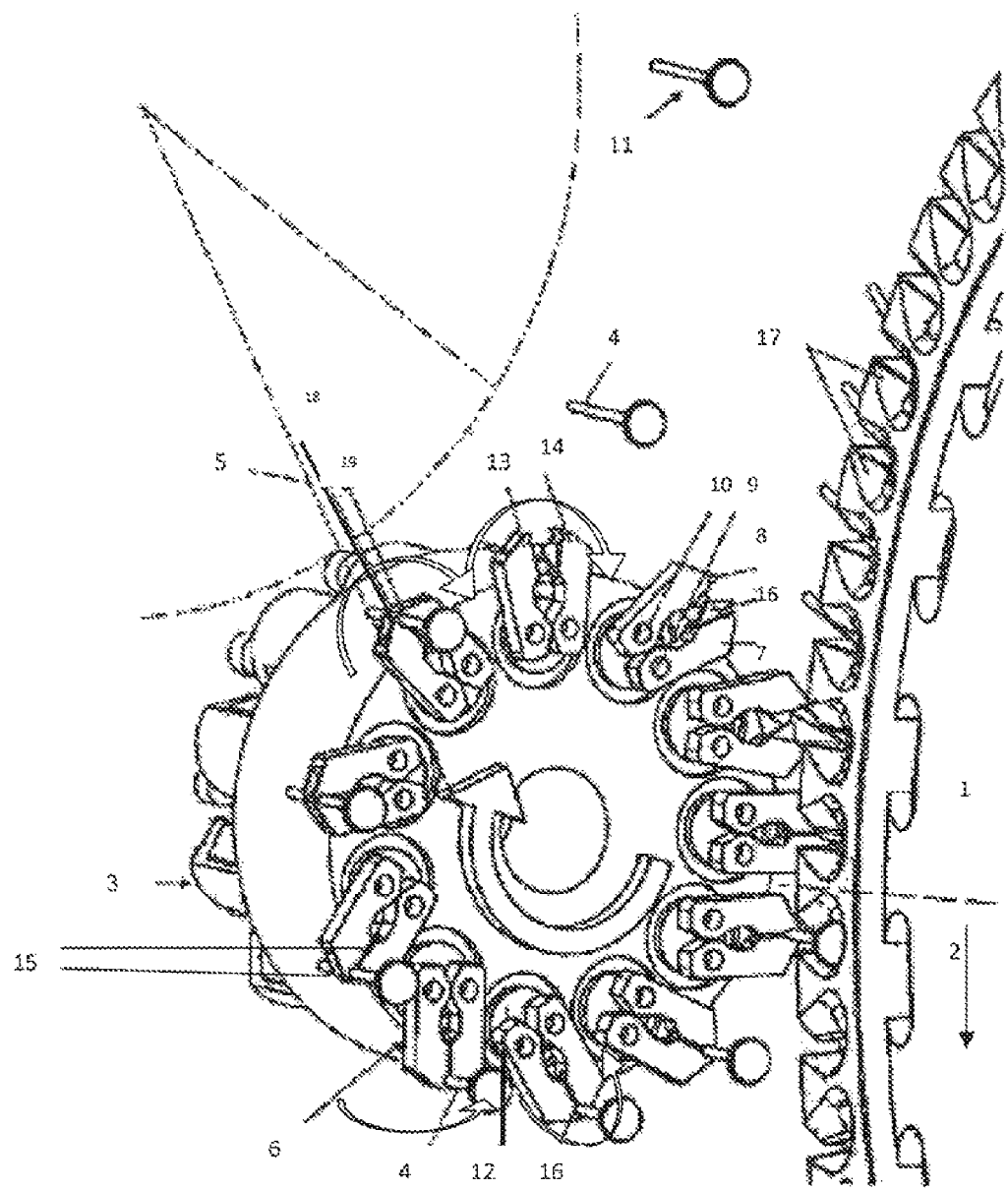

| | | | |
|---|---|---|---|
| 5,108,279 | A | 4/1992 | Heckler et al. |
| 5,117,613 | A | 6/1992 | Pfaffmann |
| 5,241,807 | A | 9/1993 | Quick et al. |
| 5,450,706 | A | 9/1995 | Latini |
| 5,519,981 | A | 5/1996 | Fukusaki |
| 5,826,403 | A | 10/1998 | Haley |
| 6,402,496 | B2 | 6/2002 | Ishikawa et al. |
| 6,633,480 | B1 | 10/2003 | Herzog |
| 7,210,916 | B2 | 5/2007 | Korndorfer et al. |
| 7,344,742 | B2 | 3/2008 | Wray et al. |
| 7,578,777 | B2 * | 8/2009 | Draghetti et al. ............ 493/39 |
| 7,730,699 | B2 * | 6/2010 | Asma ............................ 53/594 |
| 7,739,860 | B2 * | 6/2010 | Van Rens ..................... 53/466 |
| 2007/0272089 | A1 | 11/2007 | Asma |
| 2009/0019820 | A1 | 1/2009 | Asma |

FOREIGN PATENT DOCUMENTS

| | | |
|---|---|---|
| DE | 19502562 | 8/1996 |
| DE | 19616989 | 10/1997 |
| DE | 10319829 | 11/2004 |
| EP | 0073535 A2 | 3/1983 |
| EP | 0616942 | 9/1994 |
| EP | 0950608 | 4/1998 |
| EP | 09050608 | 4/1998 |
| EP | 1041005 | 10/1998 |
| EP | 0742152 B1 | 8/1999 |
| EP | 0737619 B1 | 11/1999 |
| EP | 0956776 | 11/1999 |
| EP | 0842854 B1 | 3/2001 |
| EP | 1357063 | 3/2005 |
| GB | 328145 | 4/1930 |
| GB | 374653 | 6/1932 |
| GB | 406220 | 2/1934 |
| GB | 998643 | 7/1965 |
| GB | 1214983 | 12/1970 |
| GB | 2219725 | 12/1989 |
| GB | 2229347 | 9/1990 |
| GB | 2312411 A | 10/1997 |
| JP | 9039919 | 2/1997 |
| NL | 1028769 C2 | 10/2006 |
| WO | 0041573 | 7/2000 |
| WO | 03/086871 | 10/2003 |
| WO | 2004/066747 | 8/2004 |
| WO | 2004/113172 | 12/2004 |
| WO | 2005/041679 | 5/2005 |
| WO | 2006/108781 | 10/2006 |
| WO | 20068108782 | 10/2006 |
| WO | 2006/136394 | 12/2006 |
| WO | 2007/121930 | 11/2007 |
| WO | 2007/134708 A2 | 11/2007 |

OTHER PUBLICATIONS

Copending application., U.S. Appl. No. 12/301,111, filed Nov. 17, 2008, ( also published as WO2007/134708).

Copending application, U.S. Appl. No. 10/578,812, filed Mar. 8, 2007, published as 2007/0272089.

Copending application, U.S. Appl. No. 11/911,295, filed Oct. 11, 2007, (WO2006/08782).

Copending application, U.S. Appl. No. 11/911,293, filed Oct. 11, 2007, (WO2006/108781).

Copending application., U.S. Appl. No. 11/933,129, filed Dec. 19, 2007, (WO2006/136394).

International Search Report PCT/EP2007/003455, published Nov. 1, 2007, published as WO2007/121930A1.

International Preliminary Report on Patentability, Dated Jul. 28, 2008, Application No. PCT/EP2007/003455.

* cited by examiner

SINGLING MACHINE FOR LOLLIPOPS

CLAIM OF BENEFIT OF FILING DATE

The present application claims the benefit of the filing date of PCT Application Serial No. PCT/EP2007/003455, (filed Apr. 20, 2007) (Published as WO 2007/121930); EP 06008187.4 (filed Apr. 20, 2006); and EP 06010176.3 (filed May 17, 2006), the contents of which are hereby incorporated by reference in their entirety.

The invention relates to a singling machine for lollipops, which is part of a machine to package lollipops.

It is known to package articles like sweets in a film/foil sheet, in which case the articles must be separated before they are packaged. This separation can be carried out with a machine as taught in the patent EP 1 357 063 B1. However, this machine is not suitable for the separation of lollipops.

It is an object of the invention to provide the singling equipment of a packaging machine for lollipops which is able to achieve a high frequency.

The problem is solved with a singling equipment for a device for packaging articles, comprising a singling plate which rotates around an axis and a removing wheel which rotates around another axis and which comprises a plurality of removing units with two grippers for receiving and clamping the articles, whereas both grippers are pivotable around a respective gripper lever axis, each removing unit is rotable around an own pivot axis and each gripper has a gripper jaw, whereas the distance between the gripper lever axis and the gripping jaw is equal at each gripper-pair and the gripper jaws are designed to grip the stick of a lollipop.

According to the present invention, the inventive singling equipment comprises a singling plate, which rotates around an axis, thereby orienting the randomly incoming lollipops into individual holding spaces, preferably such, that the stick of the lollipop extends outside the singling plates.

Furthermore, the inventive equipment comprises a removing wheel. The removing wheel rotates around an axis of rotation for taking the lollipop from the singling plate and delivering it to a processing station situated downstream thereof in the processing direction. Such a station is for example a station supplying packaging for the lollipop. This removing wheel is provided with a series of removing units each comprising a pair of grippers between which the stick of the lollipop is clamped and thus removed from the singling plate. In order to facilitate the removal, the removing units can be accelerated/decelerated relative to the rotational movement of the removing wheel in order to increase the time available for the pick-up without limiting the speed of rotation of the removing wheel. The acceleration/deceleration is realized by a rotation of the removing units relative to the removing wheel around a pivot axis. The axis of rotation and the pivot axis are parallel to each other. Furthermore the grippers are rotatably attached to the removing unit. Each gripper pivots around a gripper lever axis, which is attached to the removing unit and parallel to the pivot axis of the removing unit. The rotation of the grippers preferably takes place by rotating the respective removing unit. The grippers rotate between a clamping position and an open position.

According to the present invention each gripper comprises a gripper jaw, whereas the distance between the gripper lever axis and the gripping jaw is equal at each gripper-pair.

Furthermore the gripper jaws are designed to grip the stick of a lollipop. Preferably the grippers have indentations which receive the stick of the lollipop. With these indentations, the stick of the lollipop can be held in a predetermined position without damaging the stick. The indentations are designed according to the shape of the stick. Due to the indentations, the stick is preferably clamped at its entire circumference.

Even more preferably grippers have guiding means, which guide the stick of the lollipop into the indentation. Thus, it is avoided, that the grippers miss the stick or that the stick is gripped in a random position, which complicates the further processing of the lollipop.

Preferably, the grippers contact one another in a position intermediate the two gripper lever axis.

Preferably, each gripper jaw has two gripping-planes, which are spaced apart from each other so that they interact in different positions with the stick of the lollipop. This preferred embodiment of the present invention facilitates the fixture of the stick in a certain position which improves the further processing of the lollipops.

Preferably both grippers of one removing unit are essentially identical.

Preferably, the removing wheel is located behind the circumference of the singling plate, so that the grippers can easily grip the sticks of lollipops.

The invention is now explained in further details initializing the only FIG. 1. These explanations do not limit the scope of protection of the present invention.

The inventive singling equipment is used to process lollipops 11 with a stick 4. A singling plate 1 rotates counterclockwise around an axis of rotation 2 as depicted by the arrow. The singling plate 1 further comprises holding spaces 17, into which the lollipops are arranged due to the rotation of the singling plate 1 such, that the stick 4 extends over the circumference of the singling plate 1. The lollipops 11 are removed from the singling plate by a removing wheel 3 which rotates clockwise around an axis of rotation 5 as depicted by the arrow. On the removing wheel 3 several removing units 6 are rotatably attached. They can be accelerated or decelerated relative to the movement of the removing wheel 3. Each removing unit 6 comprises two grippers 7,8 which are pivotably attached to the removing unit 6 by the gripper lever axis 9, 10. Due to the pivotation, the grippers can be moved reversibly from an open position into a gripping position. Each gripper comprises a gripper jaw 13, 14 which grips the stick. In order to grip the stick in a pre-determent fixed position, each gripper jaw has an indentation 16 which is designed according to the size of the stick, so that the two grippers 13, 14 grip the stick 4 at its entire circumference, without damaging the stick 4. Furthermore, each gripper comprises two gripping planes 18, 19, which are located adjacent to each other in the same plane but which are reversibly separable from each other. These gripper planes 18, 19 facilitate the gripping of the lollipop stick in a pre-determent position. Between the two gripper planes 18, 19 guiding means 15 are located which guide the stick of the lollipop into the indentation 16. The guiding means are located in two different planes, relative to the paper plane. Each gripper has respective openings into which the guiding means 15 are inserted during closing of the grippers, so that the grippers can be brought into contact with each other.

The inventive singling equipment works as follows:

The removing wheel rotates at a constant speed. In the three o'clock position, the two grippers 7, 8 of the respective removing unit 6 are spaced apart, so that the lollipop, which was gripped by this removing unit 6 can be handed over to an other machine, which is not depicted. Right after the handover, the removing unit 6 rotates counter-clockwise relative to the constant movement of the removing wheel. Due to this deceleration, three removing units 6, in the vicinity of the six o'clock position, are essentially parallel to each other, have a relatively small distance relative to each other and can interact with a lollipop, respectively. In the six o'clock position, the removing units 6 must have the same velocity as the singling plate 1 in order to allow a smooth take out of the lollipops out of the singling wheel. In the six o'clock position, the grippers of the removing unit are closed and the lollipop 11 is removed from the singling plate 1. Before the removing units 6 reach the three o'clock position again, they are accelerated so that their velocity matches with the velocity of the next machine (not depicted), which is higher than the velocity of the removing wheel. This acceleration creates more distance between the lollipops, so that more space for wrapping is provided and allows a smooth handover of the lollipops to the next machine. Due to the indentation 16 as well as due to the two gripping planes 18, 19, 20 the stick of the lollipop is parallel to the axis of rotation 5 of the removing wheel 3, which facilitates the removal of the lollipop out of the singling plate 1 as well as the hand-over of the lollipop to the next process step.

REFERENCE NUMBERS 1 singling plate
2 axis of rotation
3 removing wheel
4 stick
5 axis of rotation
6 removing units
7 gripper
8 gripper
9 gripper lever axis
10 gripper lever axis
11 articles
12 pivot axis
13 gripper jaw
14 gripper jaw
15 guiding means
16 indentation
17 holding spaces
18 first gripper plane
19 second gripper plane

The invention claimed is:

1. Singling equipment for a device for packaging articles, comprising a singling plate which rotates around an axis and a removing wheel which rotates around an axis and which comprises a plurality of removing units with two grippers for receiving and clamping the articles, whereas both grippers are pivotable around a respective gripper lever axis, each removing unit is rotable around an own pivot axis and each gripper has a gripper jaw, characterized in, that the distance between the gripper lever axis and the gripping jaw is equal at each gripper-pair and that the gripper jaws are designed to grip the stick of a lollipop and that the grippers have indentations which receive the stick of the lollipop and guiding means which guide the stick of the lollipop into the indentation.

2. Singling equipment according to claim 1, characterized in, that the grippers contact one another in a position intermediate the two gripper lever axis.

3. Singling equipment according to claim 1, characterized in, that each gripper jaw has two gripping-planes.

4. Singling equipment according to claim 1, characterized in, that both grippers of one removing unit are essentially identical.

5. Singling equipment according to claim 1, characterized in, that the removing wheel is located behind the circumference of the singling plate.

6. Singling equipment according to claim 1, characterized in, that the motion of the removing unit and/or the motion of the grippers is derived from the rotation of the removing wheel.

7. Singling equipment according to claim 1, wherein the singling plate includes holding spaces where lollipops are arranged and the stick of the lollipops extends over a circumference of the singling plate.

8. Singling equipment according to claim 1, wherein the removing wheel rotates at a constant speed.

9. Singling equipment according to claim 1, wherein removing wheel delivers lollipops to a station for packaging the lollipops.

10. Singling equipment according to claim 1, wherein the removing units are accelerated/decelerated relative to the rotation movement of the removing wheel so that the time available for the pick-up is increased without limiting the speed of rotation of the removing wheel.

11. Singling equipment for a device for packaging articles comprising:
    a singling plate which rotates around an axis; and
    a removing wheel which rotates around an axis and which comprises a plurality of removing units with two grippers for receiving and clamping the articles,
    wherein both grippers are pivotable around a respective gripper lever axis, each removing unit is rotable around an own pivot axis and each gripper has a gripper jaw;
    wherein the distance between the gripper lever axis and the gripping jaw is equal at each gripper-pair and that the gripper jaws are designed to grip the stick of a lollipop and that the grippers have indentations which receive the stick of the lollipop and guiding means which guide the stick of the lollipop into the indentation; and
    wherein the motion of the removing unit and/or the motion of the grippers is derived from the rotation of the removing wheel.

12. The singling equipment according to claim 11, wherein the grippers contact one another in a position intermediate the two gripper lever axis.

13. The singling equipment according to claim 12, wherein each gripper jaw has two gripping-planes.

14. The singling equipment according to claim 13, wherein both grippers of one removing unit are essentially identical.

15. The singling equipment according to claim 14, wherein the removing wheel is located behind the circumference of the singling plate.

16. The singling equipment according to claim 15, wherein removing wheel delivers lollipops to a station for packaging the lollipops.

17. The singling equipment according to claim 16, wherein the removing units are accelerated/decelerated relative to the rotation movement of the removing wheel so that the time available for the pick-up is increased without limiting the speed of rotation of the removing wheel.

18. The singling equipment according to claim 11, wherein each gripper jaw has two gripping-planes.

19. The singling equipment according to claim 11, wherein both grippers of one removing unit are essentially identical.

20. The singling equipment according to claim 11, wherein the removing wheel is located behind the circumference of the singling plate.

* * * * *